(12) United States Patent
Reed et al.

(10) Patent No.: US 9,179,033 B2
(45) Date of Patent: Nov. 3, 2015

(54) DIGITAL WATERMARKING IN DATA REPRESENTING COLOR CHANNELS

(75) Inventors: Alastair M. Reed, Lake Oswego, OR (US); Trent J. Brundage, Sherwood, OR (US)

(73) Assignee: Digimarc Corporation, Beaverton, OR (US)

(*) Notice: Subject to any disclaimer, the term of this patent is extended or adjusted under 35 U.S.C. 154(b) by 105 days.

(21) Appl. No.: 13/245,353

(22) Filed: Sep. 26, 2011

(65) Prior Publication Data
US 2012/0014557 A1    Jan. 19, 2012

Related U.S. Application Data

(60) Division of application No. 12/814,218, filed on Jun. 11, 2010, now Pat. No. 8,027,509, which is a continuation of application No. 11/153,901, filed on Jun. 14, 2005, now Pat. No. 7,738,673, which is a (Continued)

(51) Int. Cl.
*G06T 1/00* (2006.01)
*H04N 1/32* (2006.01)

(52) U.S. Cl.
CPC .......... *H04N 1/32309* (2013.01); *G06T 1/0028* (2013.01); *G06T 1/0042* (2013.01);

(Continued)

(58) Field of Classification Search
CPC .................. H04N 1/32144; H04N 2201/327; H04N 21/8358; H04N 2201/3233; H04N 1/32208; H04N 1/32229; H04N 1/32203; H04N 19/467; H04N 1/32251; G06T 2201/0051; G06T 1/0028; G06T 1/0021

USPC .......................................... 382/100
See application file for complete search history.

(56) References Cited

U.S. PATENT DOCUMENTS

| 4,504,084 A | 3/1985 | Jauch |
| 4,597,005 A * | 6/1986 | Baleshta et al. ............... 348/472 |

(Continued)

FOREIGN PATENT DOCUMENTS

| DE | 2943436 | 5/1981 |
| EP | 590884 | 4/1994 |

(Continued)

OTHER PUBLICATIONS

Nintanavongsa et al., Using Raw Speech as a Watermark, Does it work? [on-line], 2001[retrieved Jan. 7, 2015], Comm. Multimedia Secuty Issues New Century: The International Federation Information Processing, vol. 64, pp. 241-251. Retrieved Internet: http://link.springer.com/chapter/10.1007/978-0-387-35413-2_21#.*

(Continued)

*Primary Examiner* — Matthew Bella
*Assistant Examiner* — Dennis Rosario

(57) ABSTRACT

The present disclosure relates to digital watermarking. One claim recites a method to detect two or more different digital watermarks in media. The method includes: receiving captured imagery of the media, the captured imagery comprising a plurality of image frames; for a first image frame applying a first watermark detector to search for a first digital watermark hidden within the first image frame, in which an electronic processor is programmed as the first watermark detector; and for a second image frame applying a second, different watermark detector to search for a second, different watermark hidden within the second image frame, in which an electronic processor is programmed as the second watermark detector. Other claims and combinations are provided too.

21 Claims, 13 Drawing Sheets

Blue

Red/ green

Related U.S. Application Data continuation-in-part of application No. 10/818,938, filed on Apr. 5, 2004, now Pat. No. 6,996,252, which is a continuation of application No. 09/945,243, filed on Aug. 31, 2001, now Pat. No. 6,718,046, which is a continuation-in-part of application No. 09/933,863, filed on Aug. 20, 2001, now Pat. No. 6,763,123, which is a continuation-in-part of application No. 09/898,901, filed on Jul. 2, 2001, now Pat. No. 6,721,440, which is a continuation-in-part of application No. 09/553,084, filed on Apr. 19, 2000, now Pat. No. 6,590,996, said application No. 11/153,901 is a continuation-in-part of application No. 10/115,582, filed on Apr. 2, 2002, now Pat. No. 6,912,295, which is a continuation-in-part of application No. 09/945,243, which is a continuation-in-part of application No. 09/933,863, which is a continuation-in-part of application No. 09/898,901, which is a continuation-in-part of application No. 09/553,084, said application No. 11/153,901 is a continuation-in-part of application No. 10/823,514, filed on Apr. 12, 2004, now Pat. No. 7,027,614, which is a continuation of application No. 09/898,901, which is a continuation-in-part of application No. 09/553,084.

(52) U.S. Cl.
CPC ...... *H04N1/32144* (2013.01); *H04N 1/32208* (2013.01); *H04N 1/32229* (2013.01); *H04N 1/32251* (2013.01); *H04N 1/32288* (2013.01); *H04N 1/32293* (2013.01); *G06T 2201/0051* (2013.01); *H04N 2201/327* (2013.01)

(56) References Cited

U.S. PATENT DOCUMENTS

| | | |
|---|---|---|
| 4,725,462 A | 2/1988 | Kimura |
| 4,739,377 A | 4/1988 | Allen |
| 5,051,835 A | 9/1991 | Bruehl et al. |
| 5,093,147 A | 3/1992 | Andrus et al. |
| 5,291,243 A | 3/1994 | Heckman et al. |
| 5,311,331 A * | 5/1994 | Cha .............................. 358/501 |
| 5,337,361 A | 8/1994 | Wang |
| 5,363,212 A | 11/1994 | Taniuchi et al. |
| 5,385,371 A | 1/1995 | Izawa |
| 5,444,779 A | 8/1995 | Daniele |
| 5,481,377 A | 1/1996 | Udagawa et al. |
| 5,493,677 A | 2/1996 | Balogh et al. |
| 5,502,576 A | 3/1996 | Ramsay et al. |
| 5,530,751 A | 6/1996 | Morris |
| 5,530,759 A | 6/1996 | Braudaway et al. |
| 5,557,412 A | 9/1996 | Saito et al. |
| 5,568,555 A | 10/1996 | Shamir |
| 5,572,433 A | 11/1996 | Falconer et al. |
| 5,617,119 A | 4/1997 | Briggs et al. |
| 5,621,810 A | 4/1997 | Suzuki et al. |
| 5,636,874 A | 6/1997 | Singer |
| 5,646,997 A | 7/1997 | Barton |
| 5,652,626 A | 7/1997 | Kawakami et al. |
| 5,659,628 A | 8/1997 | Tachikawa et al. |
| 5,659,726 A | 8/1997 | Sandford et al. |
| 5,661,574 A | 8/1997 | Kawana |
| 5,664,018 A | 9/1997 | Leighton |
| 5,687,236 A | 11/1997 | Moskowitz et al. |
| 5,689,623 A | 11/1997 | Pinard |
| 5,696,594 A | 12/1997 | Saito et al. |
| 5,721,788 A | 2/1998 | Powell et al. |
| 5,729,741 A | 3/1998 | Liaguno et al. |
| 5,748,763 A | 5/1998 | Rhoads |
| 5,760,386 A | 6/1998 | Ward |
| 5,787,186 A | 7/1998 | Schroeder |
| 5,788,285 A | 8/1998 | Wicker |
| 5,790,693 A | 8/1998 | Graves et al. |
| 5,790,703 A | 8/1998 | Wang |
| 5,809,139 A | 9/1998 | Girod et al. |
| 5,822,436 A | 10/1998 | Rhoads |
| 5,825,892 A | 10/1998 | Braudaway et al. |
| 5,832,186 A | 11/1998 | Kawana |
| 5,838,814 A | 11/1998 | Moore |
| 5,841,491 A | 11/1998 | D'Alfonso et al. |
| 5,862,218 A | 1/1999 | Steinberg |
| 5,862,260 A | 1/1999 | Rhoads |
| 5,875,249 A | 2/1999 | Mintzer et al. |
| 5,893,101 A | 4/1999 | Balogh et al. |
| 5,905,800 A | 5/1999 | Moskowitz et al. |
| 5,905,819 A | 5/1999 | Daly |
| 5,915,027 A | 6/1999 | Cox et al. |
| 5,919,730 A | 7/1999 | Gasper et al. |
| 5,930,369 A | 7/1999 | Cox et al. |
| 5,933,798 A | 8/1999 | Linnartz |
| 5,946,414 A | 8/1999 | Cass et al. |
| 5,951,055 A | 9/1999 | Mowry, Jr. |
| 5,960,081 A | 9/1999 | Vynne et al. |
| 5,960,103 A | 9/1999 | Graves et al. |
| 5,974,548 A | 10/1999 | Adams |
| 5,978,013 A | 11/1999 | Jones et al. |
| 6,045,656 A | 4/2000 | Foster et al. |
| 6,046,808 A | 4/2000 | Fateley |
| 6,054,021 A | 4/2000 | Kurrle et al. |
| 6,081,827 A | 6/2000 | Reber |
| 6,094,483 A | 7/2000 | Fridrich et al. |
| 6,095,566 A | 8/2000 | Yamamoto et al. |
| 6,104,812 A | 8/2000 | Koltai et al. |
| 6,122,403 A | 9/2000 | Rhoads |
| 6,136,752 A | 10/2000 | Paz-Pujalt et al. |
| 6,185,312 B1 | 2/2001 | Nakamura et al. |
| 6,185,683 B1 | 2/2001 | Ginter et al. |
| 6,192,138 B1 | 2/2001 | Yamadaji |
| 6,201,879 B1 | 3/2001 | Bender et al. |
| 6,229,924 B1 | 5/2001 | Rhoads et al. |
| 6,233,347 B1 | 5/2001 | Chen et al. |
| 6,233,684 B1 | 5/2001 | Stefik et al. |
| 6,234,537 B1 | 5/2001 | Gutmann et al. |
| 6,246,777 B1 | 6/2001 | Agarwal |
| 6,268,866 B1 | 7/2001 | Shibata |
| 6,272,176 B1 | 8/2001 | Srinivasan |
| 6,272,248 B1 | 8/2001 | Saitoh et al. |
| 6,272,634 B1 | 8/2001 | Tewfik et al. |
| 6,278,792 B1 | 8/2001 | Cox et al. |
| 6,281,165 B1 | 8/2001 | Cranford |
| 6,285,776 B1 | 9/2001 | Rhoads |
| 6,304,345 B1 | 10/2001 | Patton et al. |
| 6,307,949 B1 | 10/2001 | Rhoads |
| 6,311,214 B1 | 10/2001 | Rhoads |
| 6,314,192 B1 | 11/2001 | Chen et al. |
| 6,320,675 B1 | 11/2001 | Sakaki et al. |
| 6,332,031 B1 | 12/2001 | Rhoads et al. |
| 6,332,194 B1 | 12/2001 | Bloom et al. |
| 6,334,187 B1 | 12/2001 | Kadono |
| 6,356,363 B1 | 3/2002 | Cooper et al. |
| 6,373,965 B1 | 4/2002 | Liang |
| 6,381,341 B1 | 4/2002 | Rhoads |
| 6,385,329 B1 | 5/2002 | Sharma et al. |
| 6,390,362 B1 | 5/2002 | Martin |
| 6,394,358 B1 | 5/2002 | Thaxton et al. |
| 6,404,926 B1 | 6/2002 | Miyahara et al. |
| 6,408,082 B1 | 6/2002 | Rhoads et al. |
| 6,418,232 B1 | 7/2002 | Nakano et al. |
| 6,421,070 B1 | 7/2002 | Ramos et al. |
| 6,424,725 B1 | 7/2002 | Rhoads et al. |
| 6,425,081 B1 | 7/2002 | Iwamura |
| 6,427,020 B1 | 7/2002 | Rhoads |
| 6,438,251 B1 | 8/2002 | Yamaguchi |
| 6,456,726 B1 | 9/2002 | Yu |
| 6,481,753 B2 | 11/2002 | Van Boom et al. |
| 6,504,941 B2 | 1/2003 | Wong |
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,553,129 B1 | 4/2003 | Rhoads |
| 6,563,936 B2 | 5/2003 | Brill et al. |
| 6,567,533 B1 | 5/2003 | Rhoads |

(56) References Cited

U.S. PATENT DOCUMENTS

| | | |
|---|---|---|
| 6,580,808 B2 | 6/2003 | Rhoads |
| 6,590,996 B1 | 7/2003 | Reed et al. |
| 6,611,607 B1 | 8/2003 | Davis et al. |
| 6,614,914 B1 | 9/2003 | Rhoads et al. |
| 6,636,615 B1 | 10/2003 | Rhoads et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,674,802 B2 | 1/2004 | Knee et al. |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,760,463 B2 | 7/2004 | Rhoads |
| 6,763,122 B1 | 7/2004 | Rodriguez et al. |
| 6,763,123 B2 | 7/2004 | Reed et al. |
| 6,763,124 B2 | 7/2004 | Alattar et al. |
| 6,768,809 B2 | 7/2004 | Rhoads et al. |
| 6,771,795 B1 * | 8/2004 | Isnardi ............ 382/100 |
| 6,775,392 B1 | 8/2004 | Rhoads |
| 6,785,815 B1 | 8/2004 | Serret-Avila et al. |
| 6,798,894 B2 | 9/2004 | Rhoads |
| 6,804,377 B2 | 10/2004 | Reed et al. |
| 6,813,366 B1 | 11/2004 | Rhoads |
| 6,879,701 B1 | 4/2005 | Rhoads |
| 6,891,959 B2 | 5/2005 | Reed et al. |
| 6,912,295 B2 | 6/2005 | Reed et al. |
| 6,917,724 B2 | 7/2005 | Seder et al. |
| 6,920,232 B2 | 7/2005 | Rhoads |
| 6,947,571 B1 | 9/2005 | Rhoads et al. |
| 6,968,072 B1 | 11/2005 | Tian |
| 6,975,746 B2 | 12/2005 | Davis et al. |
| 6,988,202 B1 | 1/2006 | Rhoads et al. |
| 6,996,252 B2 | 2/2006 | Reed et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,072,487 B2 | 7/2006 | Reed et al. |
| 7,095,871 B2 | 8/2006 | Jones et al. |
| 7,111,170 B2 | 9/2006 | Hein et al. |
| 7,113,614 B2 | 9/2006 | Rhoads |
| 7,139,408 B2 | 11/2006 | Rhoads et al. |
| 7,142,689 B2 * | 11/2006 | Hayashi et al. ......... 382/100 |
| 7,158,654 B2 | 1/2007 | Rhoads |
| 7,164,780 B2 | 1/2007 | Brundage et al. |
| 7,171,016 B1 | 1/2007 | Rhoads |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,391,880 B2 | 6/2008 | Reed et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,486,819 B2 | 2/2009 | Subbotin |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,564,992 B2 | 7/2009 | Rhoads |
| RE40,919 E | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Jones et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 2001/0014169 A1 | 8/2001 | Liang |
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028727 A1 | 10/2001 | Naito et al. |
| 2001/0030759 A1 | 10/2001 | Hayashi et al. |
| 2001/0030761 A1 | 10/2001 | Ideyama |
| 2001/0033674 A1 | 10/2001 | Chen et al. |
| 2001/0034705 A1 | 10/2001 | Rhoads et al. |
| 2001/0037313 A1 | 11/2001 | Lofgren et al. |
| 2001/0037455 A1 | 11/2001 | Lawandy et al. |
| 2001/0040980 A1 | 11/2001 | Yamaguchi |
| 2001/0052076 A1 | 12/2001 | Kadono |
| 2001/0053235 A1 | 12/2001 | Sato |
| 2001/0054644 A1 | 12/2001 | Liang |
| 2001/0055407 A1 | 12/2001 | Rhoads |
| 2002/0009208 A1 | 1/2002 | Alattar et al. |
| 2002/0015509 A1 | 2/2002 | Nakamura et al. |
| 2002/0018879 A1 | 2/2002 | Barnhart et al. |
| 2002/0021824 A1 | 2/2002 | Reed et al. |
| 2002/0023218 A1 | 2/2002 | Lawandy et al. |
| 2002/0027612 A1 | 3/2002 | Brill et al. |
| 2002/0027674 A1 | 3/2002 | Tokunaga et al. |
| 2002/0031241 A1 | 3/2002 | Kawaguchi et al. |
| 2002/0033844 A1 | 3/2002 | Levy et al. |
| 2002/0040433 A1 | 4/2002 | Kondo |
| 2002/0057431 A1 | 5/2002 | Fateley et al. |
| 2002/0059162 A1 | 5/2002 | Shinoda |
| 2002/0061121 A1 | 5/2002 | Rhoads et al. |
| 2002/0061122 A1 | 5/2002 | Fujihara |
| 2002/0062442 A1 | 5/2002 | Kurahashi |
| 2002/0064298 A1 | 5/2002 | Rhoads et al. |
| 2002/0067844 A1 | 6/2002 | Reed et al. |
| 2002/0068987 A1 | 6/2002 | Hars |
| 2002/0073317 A1 | 6/2002 | Hars |
| 2002/0080396 A1 | 6/2002 | Silverbrook et al. |
| 2002/0083123 A1 | 6/2002 | Freedman et al. |
| 2002/0097873 A1 | 7/2002 | Petrovic |
| 2002/0099943 A1 | 7/2002 | Rodriguez et al. |
| 2002/0101597 A1 | 8/2002 | Hoover |
| 2002/0118381 A1 | 8/2002 | Shirai et al. |
| 2002/0118394 A1 | 8/2002 | McKinley et al. |
| 2002/0122568 A1 | 9/2002 | Zhao |

(56) References Cited

U.S. PATENT DOCUMENTS

| | | |
|---|---|---|
| 2002/0131076 A1 | 9/2002 | Davis |
| 2002/0141310 A1 | 10/2002 | Stephany |
| 2002/0150246 A1 | 10/2002 | Ogino |
| 2002/0153661 A1 | 10/2002 | Brooks et al. |
| 2002/0163633 A1 | 11/2002 | Cohen |
| 2002/0163671 A1 | 11/2002 | Takaragi |
| 2002/0164051 A1 | 11/2002 | Reed et al. |
| 2002/0176003 A1 | 11/2002 | Seder et al. |
| 2002/0176600 A1 | 11/2002 | Rhoads et al. |
| 2002/0178368 A1 | 11/2002 | Yin et al. |
| 2002/0186886 A1 | 12/2002 | Rhoads |
| 2002/0196272 A1 | 12/2002 | Ramos et al. |
| 2003/0005304 A1 | 1/2003 | Lawandy et al. |
| 2003/0012562 A1 | 1/2003 | Lawandy et al. |
| 2003/0032033 A1 | 2/2003 | Anglin et al. |
| 2003/0040957 A1 | 2/2003 | Rodriguez et al. |
| 2003/0056104 A1 | 3/2003 | Carr et al. |
| 2003/0105730 A1 | 6/2003 | Rhoads et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0201696 A1 | 10/2004 | Yoda |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0062428 A1 | 3/2006 | Alattar et al. |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Rhoads et al. |
| 2010/0172540 A1 | 7/2010 | Davis et al. |
| 2010/0198941 A1 | 8/2010 | Rhoads |
| 2011/0007936 A1 | 1/2011 | Rhoads |
| 2011/0026777 A1 | 2/2011 | Rhoads et al. |
| 2011/0051998 A1 | 3/2011 | Rhoads |

FOREIGN PATENT DOCUMENTS

| | | |
|---|---|---|
| EP | 642060 | 3/1995 |
| EP | 705022 | 4/1996 |
| EP | 991047 | 4/2000 |
| EP | 1077570 | 2/2001 |
| EP | 1137244 | 9/2001 |
| EP | 1152592 | 11/2001 |
| EP | 1173001 | 1/2002 |
| EP | 1209897 | 5/2002 |
| GB | 1534403 | 12/1978 |
| GB | 2360659 | 9/2001 |
| JP | H07093567 | 4/1995 |
| JP | H07108786 | 4/1995 |
| WO | WO 95/13597 | 5/1995 |
| WO | WO 96/03286 | 2/1996 |
| WO | WO 96/36163 | 11/1996 |
| WO | WO 99/10837 | 3/1999 |
| WO | WO 00/16546 | 3/2000 |
| WO | WO01/05075 | 1/2001 |
| WO | WO01/08405 | 2/2001 |
| WO | WO01/39121 | 5/2001 |
| WO | WO01/72030 | 9/2001 |
| WO | WO01/73997 | 10/2001 |
| WO | WO01/97128 | 12/2001 |
| WO | WO01/97175 | 12/2001 |
| WO | WO02/17631 | 2/2002 |
| WO | WO02/19269 | 3/2002 |
| WO | WO02/21846 | 3/2002 |
| WO | WO02/23481 | 3/2002 |
| WO | WO02/087250 | 10/2002 |
| WO | WO01/88883 | 11/2002 |

OTHER PUBLICATIONS

U.S. Appl. No. 09/343101, filed Jun. 29, 1999, Bruce L. Davis, et al.
U.S. Appl. No. 09/343,104, filed Jun. 29, 1999, Tony F. Rodriguez, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L Davis, et al.
U.S. Appl. No. 12/912,461, filed Oct. 26, 2010, Adnan M. Alattar.
U.S. Appl. No. 12/953,190, filed Nov. 23, 2010, Geoffrey B. Rhoads.
Alattar, "'Smart Images' Using Digimarc's Watermarking Technology," IS&T/SPIE's 12.sup.th Int. Symposium on Electronic Imaging, San Jose, CA, Jan. 25, 2000, vol. 3971, No. 25, 10 pages.
Battialo et al., "Robust Watermarking for Images Based on Color Manipulation," IH/99 LNCS 1968, pp. 302-317, 2000.
Bender et al., "Applications for Data Hiding," IBM Systems Journal, vol. 39, Nos. 3&4, 2000, pp. 547-568.
Bors et al., "Image Watermarking Using DCT Domain Contraints," Proc. Int. Conf. on Image Processing, vol. 3, pp. 231-234.
Brownell, "Counterfeiters Dye Over Security Measures," SPIE's OE Magazine, Sep. 2001, pp. 8-9.
Fleet et al., "Embedding Invisible Information in Color Images," Proc. Int. Conf. on Image Processing, vol. 1, pp. 532-535, Oct. 1997.
Frequently Asked Questions About Digimarc Signature Technology, Aug. 1, 1995, http://vww.digimarc.com, 9 pages.
Hartung et al., Digital Watermarking of Raw and Compressed Video, Proc. SPIE 2952, Digital Compression Technologies and Systems for Video Communications, Oct. 1996, pp. 205-213.
"Holographic signatures for digital images," The Seybold Report on Desktop Publishing, Aug. 1995, one page.
Hunt, "The Reproduction of Colour in Photography, Printing & Television," 1987, pp. 588-589 and Plate 35 (in color).
Koch et al., "Towards Robust and Hidden Image Copyright Labeling," Proc. of 1995 IEEE Workshop on Nonlinear Signal and Image Processing, Jun. 20-22, 1995, 4 pages.
Kohda et al., "Digital Watermarking Through CDMA Channels Using Spread Spectrum Techniques," 2000 IEEE, pp. 671-674.
Komatsu et al., "A Proposal on Digital Watermark in Document Image Communication and Its Application to Realizing a Signature," Electronics and Communications in Japan, Part 1, vol. 73, No. 5, 1990, pp. 22-33.
Komatsu et al, "Authentication System Using Concealed Image in Tetematics." Memoirs of the School of Science & Engineering, Waseda Univ., No. 52, 1988, pp. 45-60.

(56) References Cited

OTHER PUBLICATIONS

Kutter et al., "Digital Signature of Color Images Using Amplitude Modulation," SPIE vol. 3022, 1997, pp. 518-526.

ORuanaidh et al, "Watermarking Digital Images for Copyright Protection," http://www.kalman.mee.tcd.ie/people/jjr/eva_pap.html, Feb. 2, 1996, 8 pages.

Piva et al., "Exploiting the Cross-Correlation of RGB-Channels for Robust Watermarking of Color Images," 1999 IEEE, pp. 306-310.

Vidal et al., "Non-Noticeable Information Embedding in Color Images: Marking and Detection," IEEE (1999), pp. 293-297.

Voyatzis et al., "Embedding Robust Watermarks by Chaotic Mixing," Digital Signal Processing Proceedings, IEEE Jul. 1997, pp. 213-216, vol. 1.

Wang at al., "Embedding Digital Watermarks in Halftone Screens," Security and Watermarking of Multimedia Contents II, Proc. of SPIE vol. 3971 (2000), pp. 218-227.

\* cited by examiner

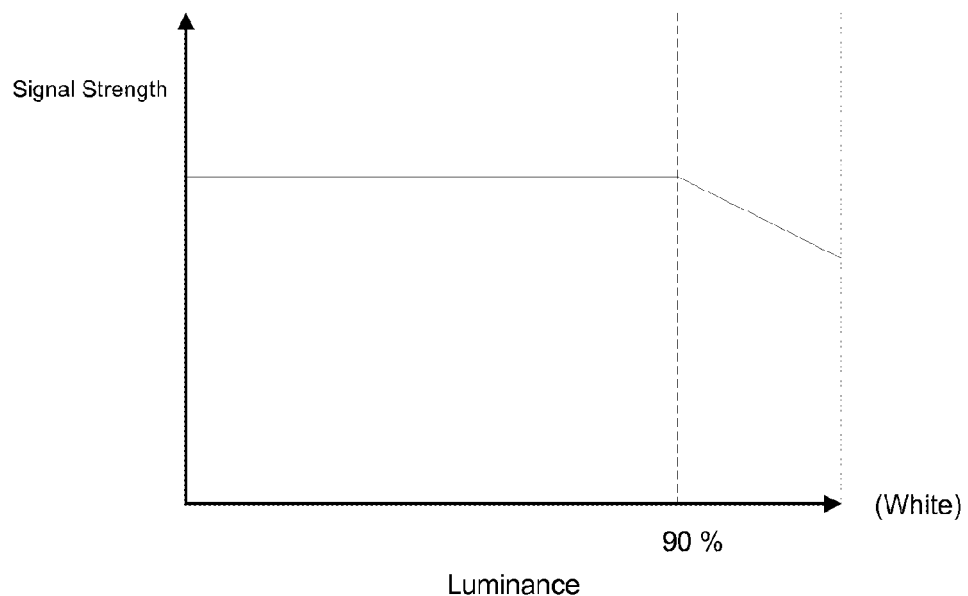
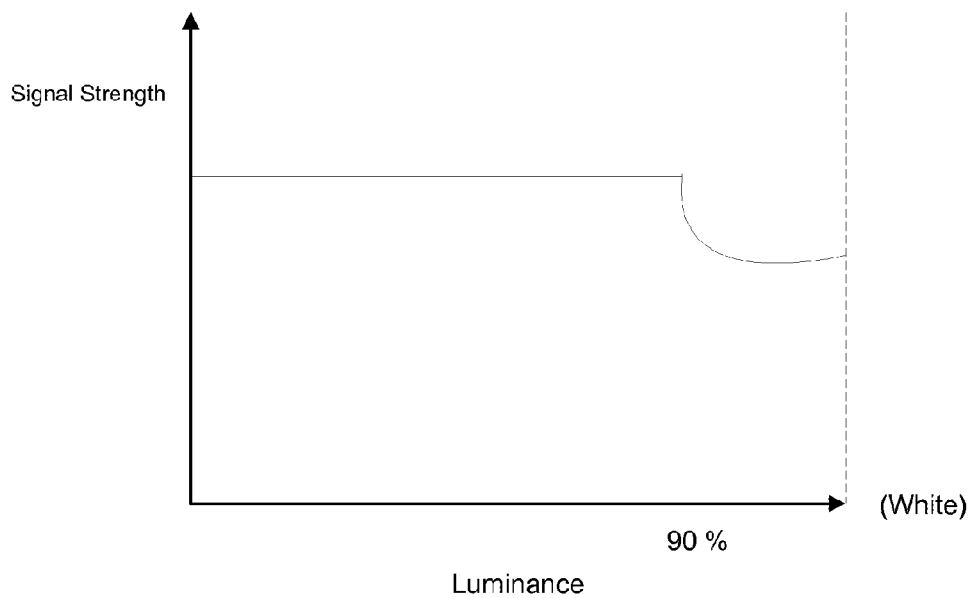

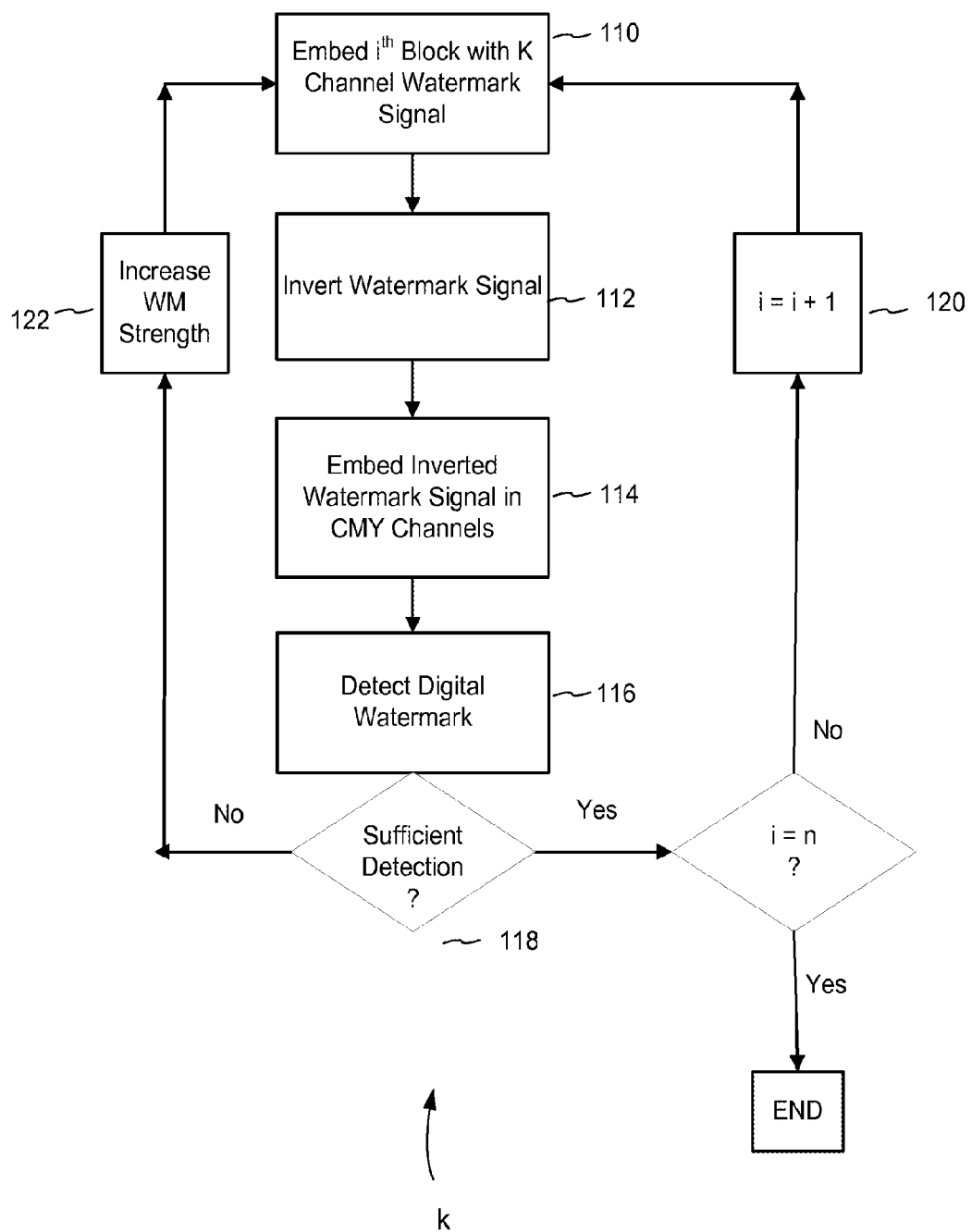

Blue

Red/
green

DIGITAL WATERMARKING IN DATA REPRESENTING COLOR CHANNELS

CROSS-REFERENCE TO RELATED PATENT APPLICATIONS

This application is a Divisional of U.S. application Ser. No. 12/814,218, filed Jun. 11, 2010, incorporated herein by reference in its entirety, which is a Continuation of U.S. application Ser. No. 11/153,901, filed Jun. 14, 2005, incorporated herein by reference in its entirety, which is a Continuation-In-Part of U.S. application Ser. No. 10/818,938, filed Apr. 5, 2004, incorporated herein by reference in its entirety, which is a Continuation of U.S. application Ser. No. 09/945,243, filed Aug. 31, 2001, incorporated herein by reference in its entirety, which is a Continuation-In-Part of U.S. application Ser. No. 09/933,863, filed Aug. 20, 2001, incorporated herein by reference in its entirety, which is a Continuation-In-Part of U.S. application Ser. No. 09/898,901, filed Jul. 2, 2001, incorporated herein by reference in its entirety, which is a Continuation-In-Part of U.S. application Ser. No. 09/553,084, filed Apr. 19, 2000 incorporated herein by reference in its entirety. U.S. application Ser. No. 11/153,901, filed Jun. 14, 2005, is a Continuation-In-Part of U.S. application Ser. No. 10/823,514, filed Apr. 12, 2004, incorporated herein by reference in its entirety, which is a Continuation of U.S. application Ser. No. 09/898,901, filed Jul. 2, 2001, incorporated herein by reference in its entirety, which is a Continuation-In-Part of U.S. application Ser. No. 09/553,084, filed Apr. 19, 2000, incorporated herein by reference in its. U.S. application Ser. No. 11/153,901, filed Jun. 14, 2005 is a Continuation-In-Part of U.S. application Ser. No. 10/115,582, filed Apr. 2, 2002, incorporated herein by reference in its entirety, which is a Continuation-In-Part of U.S. application Ser. No. 09/945,243, filed Aug. 31, 2001, incorporated herein by reference in its entirety, which is a Continuation-In-Part of U.S. application Ser. No. 09/933,863, filed Aug. 20, 2001, incorporated herein by reference in its entirety, which is a Continuation-In-Part of U.S. application Ser. No. 09/898,901, filed Jul. 2, 2001, incorporated herein by reference in its entirety, which is a Continuation-In-Part of U.S. application Ser. No. 09/553,084, filed Apr. 19, 2000, incorporated herein by reference in its entirety.

FIELD

The present disclosure relates to hiding data in color channels.

BACKGROUND AND SUMMARY

The above mentioned parent applications disclose various techniques for embedding and detecting of hidden digital watermarks.

Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

Digital watermarking systems typically have two primary components: an embedding component that embeds the watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark. Assignee's U.S. patent application Ser. No. 09/503,881, filed Feb. 14, 2000 (now U.S. Pat. No. 6,614,914), discloses various encoding and decoding techniques. U.S. Pat. Nos. 5,862,260 and 6,122,403 disclose still others. Each of these U.S. patent documents is herein incorporated by reference.

Now consider our out-of-phase digital watermarking techniques with reference to FIGS. 1a and 1b. In FIG. 1a, the dash/dot C, M, Y and K lines represent, respectively, cyan, magenta, yellow and black color channels for a line (or other area) of a media signal (e.g., a picture, image, media signal, document, etc.). The FIG. 1a lines represent a base level or a particular color (or gray-scale) level (or intensity). Of course, it is expected that the color (or gray-scale) level will vary over the media signal. FIG. 1b illustrates the media of FIG. 1a, which has been embedded with an out-of-phase digital watermark signal. The watermark signal is preferably applied to each of the color component dimensions C, M and Y.

In FIGS. 1a and 1b, the M and Y channels are represented by one signal, since these color components can be approximately equal, but separate signals. Of course, it is not necessary for these components to be equal, and in many cases the yellow and magenta components are not equal. The illustrated "bumps" (or "tweaks") in FIG. 1b represent the digital watermark signal, e.g., upward and downward signal adjustments in relation to a respective color channel at given points over the media signal. The tweaks are preferably applied at the same level (or signal strength). Alternatively, the bumps are applied with a different signal strength (or tweak level) when compared to one another. Of course, these tweaks can be embedded over a color channel in a predetermined pattern, a pseudo random fashion, a random fashion, etc., to facilitate embedding of a digital watermark signal.

For the K dimension (or channel), the digital watermark signal is preferably embedded to be out-of-phase with respect to the CMY channels. Most preferably, the K channel is approximately 180 degrees out-of-phase (e.g., inverted) with the watermark signals in the CMY color channels, as shown in FIG. 1b. For example, if a digital watermark signal modifies each of the color channels at a media' first location with a tweak level of say 7, then a tweak level of −7 correspondingly modifies the K channel at the media's first location. This digital watermark technique is referred to as our out-of-phase (or "K-phase") digital watermark. (We note that if a watermark signal is determined in terms of luminance, we can assign or weight corresponding tweak levels to the respective color plane pixel values to achieve the luminance value tweak. Indeed, a tweak can be spread over the CMY channels to achieve a collective luminance at a given media location. The luminance attributable to the CMY tweak is preferably cancelled or offset by the luminance effect attributable to a corresponding inverted K channel tweak at the give media location. Similarly, if a watermark signal is determined in terms of chrominance, we can assign or weight corresponding tweak levels to the respective color plane pixel values to achieve the chrominance value tweak. Indeed, a tweak can be spread over the CMY channels to achieve a steady luminance at a given media location. The luminance attributable to the CMY chrominance tweaks are preferably cancelled or offset by the luminance effect attributable to a corresponding inverted K channel tweak at the give media location. Or more generally, the luminance in a given localized area is preferably steady or minimal since chrominance tweaks in a first color channel reduces luminance attributable to a chrominance tweaks in a second different color channel).

Our inventive watermarking scheme greatly reduces watermark perceptibility. Since the watermark signal for the K channel is applied approximately 180 degrees out-of-phase, when compared to the respective tweaks applied to the C, M and/or Y channels, the watermark visibility is greatly reduced. The visibility reduction is achieved by the effective cancellation of perceived luminance changes when the CMYK image is viewed or printed. Indeed, combining an inverted watermark signal "tweak" or "bump" in a K channel with a corresponding non-inverted watermark signal tweak or bump in the CMY channels effectively cancels an overall perceived luminance change for a given area (e.g., a pixel or block of pixels)—greatly reducing visibility of the digital watermark.

The present disclosure discloses a new data hiding technique based on our out-of-phase technology. According to one implementation of the present disclosure, an image is hidden in or carried by a media signal. The hiding is accomplished with our out-of-phase embedding techniques. The image can be a photograph, a graphic, a barcode (1-D or 2-D), etc., etc. Another aspect of the disclosure is used to improve the visibility characteristics of our out-of-phase embedding techniques.

The foregoing and other aspects, features and advantages of the present disclosure will be even more apparent from the following detailed description, which proceeds with reference to the accompanying drawings.

BRIEF DESCRIPTION OF THE DRAWINGS

FIGS. 4 and 5 are graphs showing hidden signal strength in terms of luminance.

FIG. 11 illustrates feedback for the FIG. 10 feedback loop.

DETAILED DESCRIPTION OF THE PREFERRED EMBODIMENTS

Image Embedding

Figure 1A:
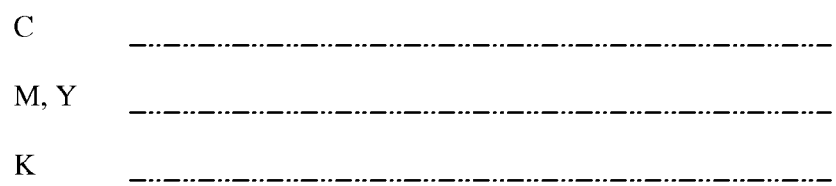
FIG. 1a is a diagram illustrating CMYK channels.
Figure 1B:
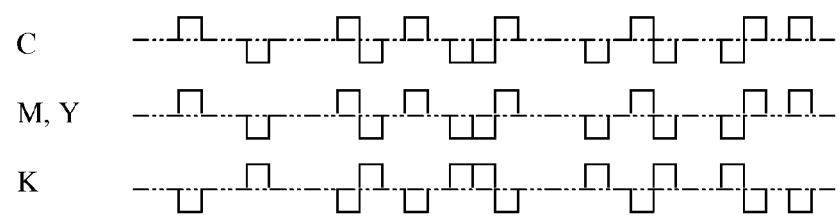
FIG. 1b illustrates the color CMYK channels of FIG. 1a, embedded with information.
Figure 2:
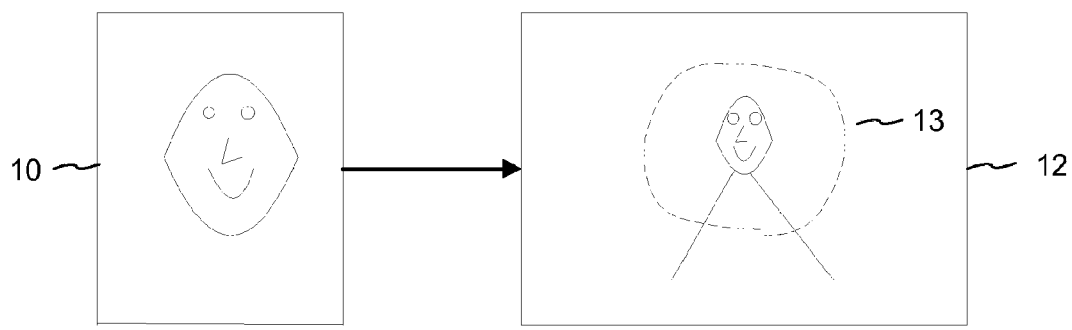
FIG. 2 illustrates hiding an image in media.

With reference to FIG. 2, an image 10 is steganographically hidden within media 12. Of course, media 12 may represent digital media such as an image, photograph, video frame, graphic, picture, logo, product tag, product documentation, visa, business card, art work, brochure, document, product packaging, trading card, banknote, deed, poster, ID card (including a driver's license, member card, identification card, security badge, passport, etc.), postage stamp, etc., etc. And image 10 can correspond to a digital representation of a photograph, picture, graphic, text, orientation fiducial, object, barcode, message, digital watermark, outline, symbol, etc., etc. In the FIG. 2 example, image 10 includes a close-up photograph, and the media includes a driver's license or passport photograph. The hiding (or embedding) is accomplished using our inventive out-of-phase techniques.

Figure 3:
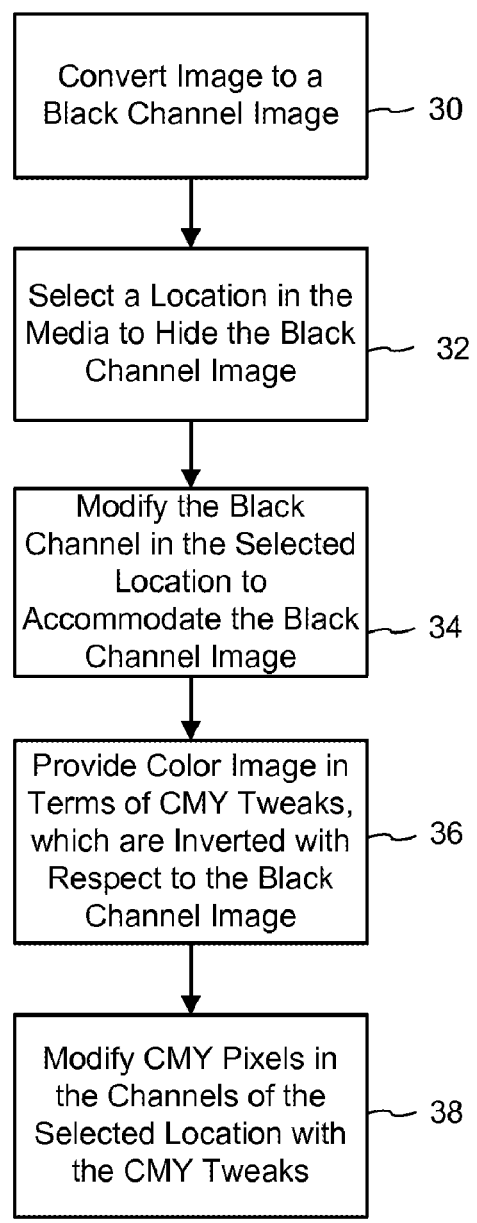
FIG. 3 is a flow diagram illustrating an embedding method according to one implementation of the present disclosure.

With reference to FIG. 3, our K-phase hiding is preferably initiated by converting image 10 to a black channel image 10' (step 30—FIG. 3). Most digital imaging software tools such as Adobe's Photoshop facilitate such a black channel conversion. The black channel image 10' includes a set of black pixel values (e.g., gray-scale values) 10'. A location in the media 12 is selected to place the black channel image (step 32). The dashed circle 13 in FIG. 2 represents this selected location. The media 12 location can be represented by sets of media 12 pixels. (For example, a first set of pixels corresponds to the selected location's black channel values, a second set corresponds to the selected location's cyan channel values, a third set corresponds to the selected location's magenta channel values, and a fourth set corresponds to the selected location's yellow channel values). The set of black channel image 10' values is applied to the black channel pixels in the selected location of media 12—effectively modifying media 12 (step 34). For example, if an image 10' pixel includes a gray-scale value of 3, this gray-scale value is applied to a corresponding pixel in the selected media 12 location to raise that corresponding pixel value by 3. In an alternative implementation, instead of adjusting the corresponding pixel in the selected media 12 location by the gray-scale value, we replace that corresponding pixel value with the black image 10' gray-scale value. In another implementation, the corresponding media 12 pixel is modified to achieve the gray-scale value of the image 10' pixel. Of course we can scale and/or weight the gray-scale value as needed prior to modifying pixels in the selected location of media 12.

The black channel image 10' is inverted to produce a set of signal tweaks (step 36). For example, if a black channel pixel is tweaked by a grayscale value of say 24, then a corresponding, inverted CMY tweak value is −24. (As an alternative implementation, image 10 is converted into corresponding C, M and Y images and such images are applied to their respective channels. These signal tweaks are then used to modify or change the color values in their respective CMY color channels (step 38). Most preferably, in the above example, the 24-tweak value is applied to each of the CMY color channels. The overall luminance cancellation can be effected as such. In another implementation we unevenly spread the tweak value over the CMY channels to achieve an overall luminance change in a given media location to cancel the +24 tweak in the black channel. For example, if using a luminance equation of: $L=0.3*C+0.6*M+0.1*Y$, we can achieve an overall luminance tweak of −24 by tweaking $C=−15$, $M=−30$ and $Y=−15$. Of course there is a vast range of other color combinations to achieve the same collective luminance change. Care should be taken, however, to minimize a color shift when using this tweak-spreading alternative. The CMY pixels and the K pixels are thus out-of-phase with respect to one another—resulting in a local cancellation of the perceived luminance change. Accordingly, image 10 is successfully hidden or carried by media 12.

The selected location 13 can be determined manually, e.g., via editing software tools (like Adobe's Photoshop). Or the selection process can be automated.

Image Hiding Enhancements

We have developed improvements to enhance our out-of-phase hiding techniques. These improvements apply to hiding both images and digital watermark signals (in this section both will be referred to as a hidden signal). While these techniques are not necessary to carry out our out-of-phase hiding techniques, they generally reduce the visibility of a hidden signal. Consider our following inventive improvements.

High Luminance Areas

Media 12 may include areas of low CMY and/or K ink (or signal intensity). In a first case, an area includes little or no C, M and/or Y ink. This results in an inability to counteract (or cancel) an inverted signal in a corresponding channel(s). Accordingly, we can sample the luminance of a media 12 area (or pixel) and, based on the luminance level, determine whether to scale back the hidden signal strength. For example, we begin to scale back the signal strength once the luminance reaches a predetermined threshold (e.g., in a range of 70-95% luminance). We can scale back the signal strength for a given area according to a linear reduction, as shown in FIG. 4, or we can scale the signal strength in a non-linear manner, e.g., as shown in FIG. 5. The illustrated scaling signal strength applies to both the K channel and CMY channels. In a related implementation, we determine the luminance of the yellow channel. We base our scaling decisions on the yellow luminance percentage.

Saturated Color

Figure 6:
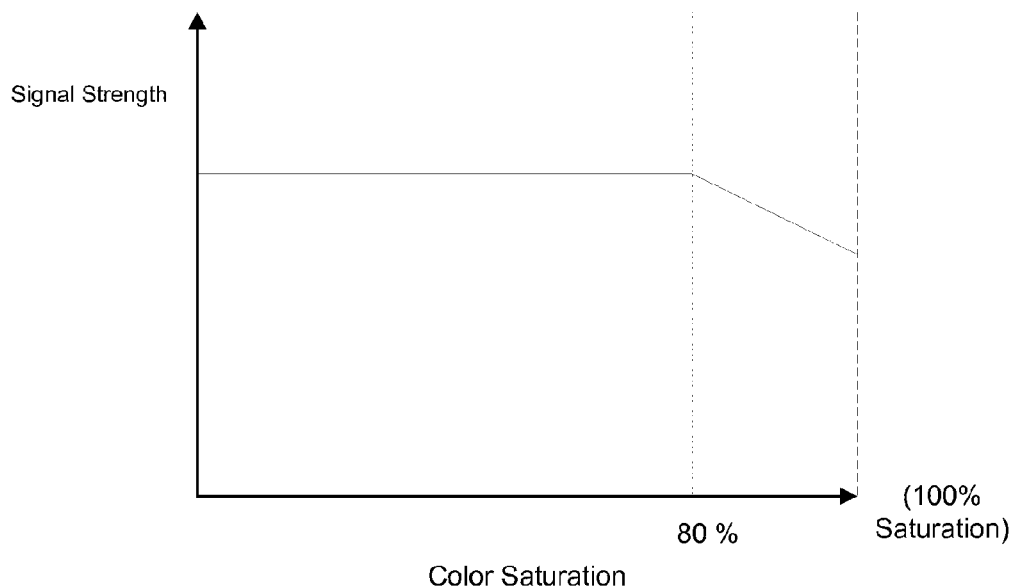
FIGS. 6 and 7 are graphs showing hidden signal strength in terms of color saturation.
Figure 7:
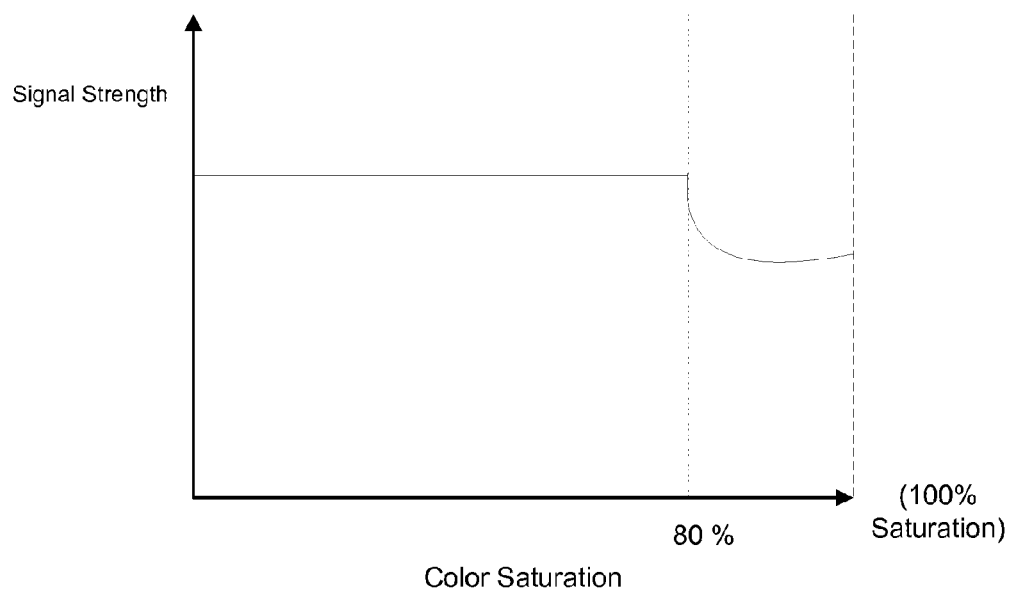

Hiding signals in a saturated color area can also result in increased hidden signal visibility concerns. For this document the term "saturation" refers to how pure a color is, or refers to a measure of color intensity. For example, saturation can represent the degree of color intensity associated with a color's perceptual difference from a white, black or gray of equal lightness. We determine the color saturation level in a color plane (e.g., the yellow color plane), and then scale back a hidden signal strength as the color saturation level exceeds a predetermined level (e.g., 80% yellow color saturation). As with the FIGS. 4 and 5 implementations, we can scale the signal strength in a linear manner (FIG. 6) or in a non-linear manner (FIG. 7).

Low or High Luminance Areas

Figure 8:
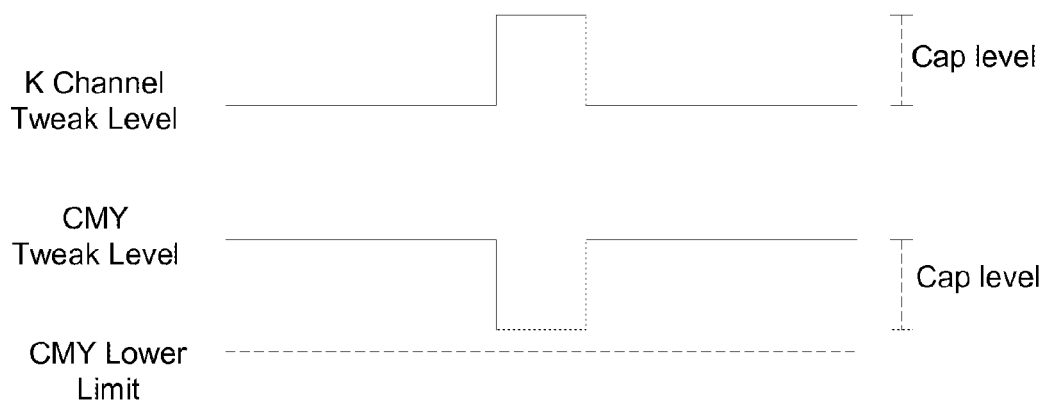
FIG. 8 illustrates limiting a signal tweak in low CMY areas to reduce hidden signal visibility.

We have found that we can even further improve the visibility characteristics of our hidden signals by considering the amount of luminance at a given pixel or other media 12 area. A low luminance may indicate that there is insufficient CMY to compensate for a K channel tweak. For example, a 10% luminance in CMY for a given pixel implies that the pixel can accommodate only about a 10% signal tweak (e.g., remember the simplified luminance relationship mentioned above: $L=0.3*C+0.6*M+0.1*Y$). With reference to FIG. 8, we can cap (or limit) the positive K tweak signal level in such low CMY areas to ensure that the CMY levels can be sufficiently decreased to counteract or cancel the positive K channel signal.

Similarly, in an area of high CMY luminance, a negative K channel tweak can be capped (or limited) to ensure a sufficient range to increase the CMY values.

Equalizing Detectability

Figure 9:
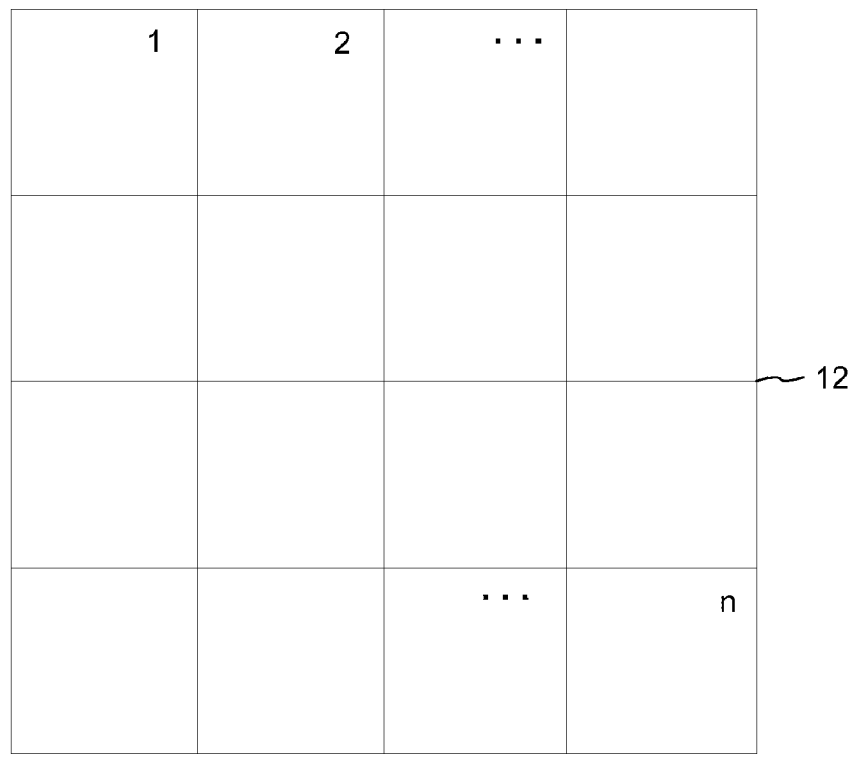
FIG. 9 illustrates the segmentation of media into blocks.
Figure 10:
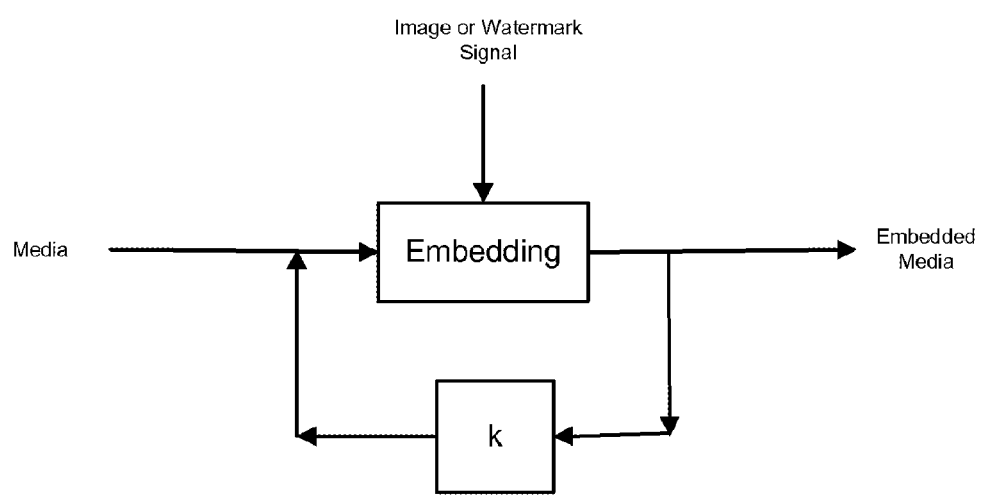
FIG. 10 illustrates a feedback loop in an embedding process.

Now consider an implementation where media 12 is segmented into a plurality of blocks (FIG. 9). Here a block size can range from a pixel to a group of pixels. We redundantly embed an image or watermark signal in each of (or a subset of) the blocks. As shown in FIG. 10, we preferably use signal feedback (k) to regulate the embedding process. A signal feedback (k) method is shown in FIG. 11. A black (K) channel image or watermark signal (in this section hereafter both referred to as a "watermark") is embedded in block i of media 12 (step 110), where "i" is an integer ranging from 1–n and where n is the total number of blocks. The watermark signal is inverted (step 112) and embedded in the CMY channels of block i (step 114). At this point, we preferably perform a detection process of the signal embedded within the $i.\text{sup}.\text{th}$ block (step 116). The detection process determines whether the signal is sufficiently detectable (step 118). The term "sufficient" in this context can include a plurality of levels. In one, "sufficient" implies that the signal is detectable. In another, the detectability of the signal is ranked (e.g., according to error correction needed, ease of detectability, or a detection-reliability metric, etc.). The term sufficient in a ranking context also implies that the detection ranking is above a predetermined threshold. The process moves to embed a new block i+1 if the embedding is sufficient (120). Otherwise the signal strength is increased or otherwise altered (step 122) and the embedding of block i is repeated.

Such a signal feedback process helps to ensure consistent embedding throughout media 12.

Image Detection

Figure 12A:
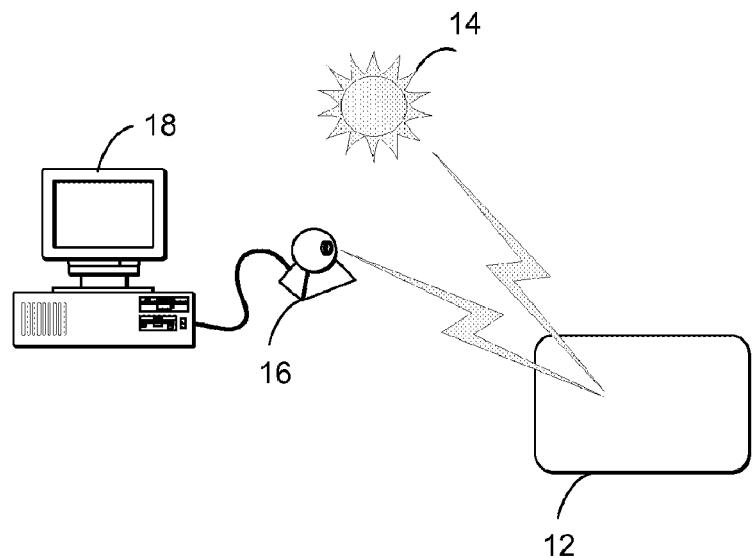
FIGS. 12a and 12b illustrate detection apparatus.

An infrared detection method is illustrated with reference to FIG. 12a. In particular, the illustrated detection method employs infrared illumination to facilitate image (or watermark) detection. Media 12 is illuminated with an infrared illumination source 14. The media 12 is embedded as discussed above, for example, to include various components in a multicolor dimension space (e.g., CMYK). A first component (or image) is preferably embedded in the CMY channels. A second component (or image) is embedded in the K channel. The second component is preferably inverted (or is out-of-phase) with respect to the CMY channels.

Infrared illumination source 14 preferably includes a light emitting diode, e.g., emitting approximately in a range of 800 nm-1400 nm, or a plurality of light emitting diodes ("LED"). Of course, there are many commercially available infrared diodes, and such may be suitable used with our present detection techniques. It will be appreciated that many commercially available incandescent light sources emit light both in the visible and infrared ("IR") spectrums. Such incandescent light sources may alternatively be used as infrared illumination source 14. Indeed, infrared watermark detection may be possible in otherwise normal ("daylight") lighting conditions, particularly when using an IR-pass filter.

A conventional power source powers the infrared illumination source. (We note that a variable trim resistor and a small wall transformer can be optionally employed to control illumination source 14). Power alternately can be supplied from a battery pack, voltage or current source, or by directly tapping a power source of a camera, e.g., internally drawn from a parallel, USB, or corded power lines. For a consumer device, a battery pack or a single power cord that is stepped down inside a digital watermark reader housing can also be used.

Returning to the composition of an out-of-phase hidden image (or watermark), a first image (or watermark) component is embedded in a K (or black) channel. A second image component, e.g., which is out-of-phase with respect to the K channel, is embedded in the CMY channels. These characteristics have significance for infrared detection. In particular, C, M and Y inks will typically have high transmission characteristics in the infrared spectrum when printed, which render them nearly imperceptible under infrared illumination. Yet conventional black inks absorb a relatively high amount of infrared light, rendering the black channel perceptible with infrared illumination. We note that standard processing inks, such as those conforming to the standard web offset press (SWOP) inks, include black ink with IR detection properties. Of course, there are many other inks that may be suitably interchanged in the present disclosure.

As discussed above our out-of-phase embedding provides an effective cancellation of perceived luminance changes when the CMYK image is viewed in the visible spectrum. Indeed, combining an inverted watermark signal "tweak" or "bump" in a K channel with a corresponding non-inverted watermark signal tweak or bump in the CMY channels effectively cancels an overall perceived luminance change. However, under infrared illumination, the hidden image (or watermark) component in the black (K) channel becomes perceptible without interference from the C, M and Y channels. An infrared image primarily portrays (e.g., emphasizes) the black channel, while the C, M and Y channels are effectively imperceptible under infrared illumination.

In one implementation, camera 16 captures an image of media 12. Preferably, camera 16 includes an IR-Pass filter that passes IR while filtering visible light. For example, the Hoya RM90 filter available from M&K Optics L.L.C. is one of many IR-Pass/Visible Opaque filters suitable for daylight detection. Another suitable filter is the RG850 filter, part number NT54-664, available from Edmund Scientific. These filters are offered as examples only, and certainly do not define the entire range of suitable IR-pass filters. Of course there are many other IR-Pass filters that are suitably interchangeable with the present disclosure.

In yet another implementation, a conventional digital camera (or web cam) is modified so as to capture infrared light. In particular, most digital cameras and web cams include an IR filter, which filters out IR light. Removing the IR filter allows the camera to capture light in the IR spectrum. Consider a visibly dark environment (e.g., an enclosed case, shielded area, dark room, etc.). Media 12 is illuminated by infrared illumination source 14 in the visibly dark environment. Camera 16 (without an IR filter) effectively captures an infrared image (i.e., the K channel image) corresponding to the illuminated media 12.

The captured image is communicated to computer 18. Preferably, computer 18 includes executable software instructions stored in memory for execution by a CPU or other processing unit. If media 12 includes a digital watermark, the software instructions preferably include instructions to detect and decode the embedded digital watermark. Otherwise, the instructions preferably include instructions to display the K-phase image. The software instructions can be stored in memory or electronic memory circuits. Of course, computer 18 can be a handheld computer, a laptop, a general-purpose computer, a workstation, etc. Alternatively, computer 18 includes a hard-wired implementation, which precludes the need for software instructions.

Figure 12B:
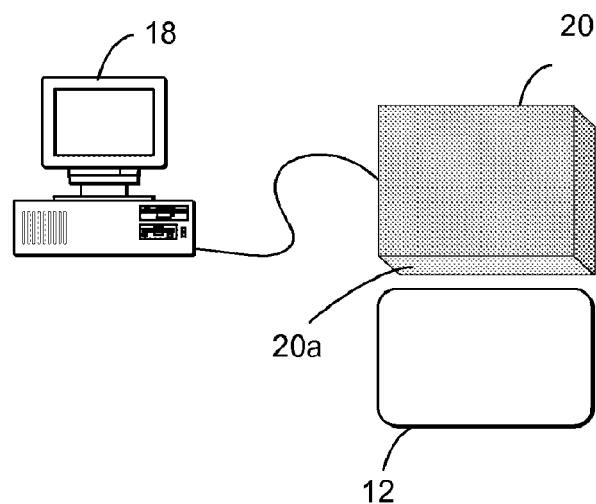

With reference to FIG. 12b, a detection housing 20 can be provided to house an infrared illumination source 14 and digital camera (both not shown in FIG. 12b, since they are within the opaque housing 20). The housing 20 is preferably opaque to shield (or otherwise constructed to filter) the camera and media 12 from visible light. The housing 20 has an opening 20a to receive the media 12. In a first case, opening 20a is adapted to engulf media 12. This allows media 12 to be placed on a surface (e.g., table, imaging station, or counter) and the housing opening 20a to be placed over media 12, effectively shielding media 12 from visible light. In a second case, the opening 20a receives media 12 into (e.g., slides media through opening 20a) and positions media 12 within the opaque housing 20. In either implementation, the infrared illumination source 14 illuminates media 12, or the digital camera 12 captures an image of the illuminated media (e.g., captures as image of the K-channel image). The digital camera 12 communicates with computing device 14, which detects and decodes a digital watermark embedded with media 12, if present, or otherwise displays the image.

In another illustrative embodiment, the above described infrared detection technique is carried out in a visibly dark environment, such as a dark room, shielded area, etc. An out-of-phase image (or digital watermark) is embedded in media. The media is illuminated with an infrared illumination source, and a digital camera captures an image of the illuminated media.

In still another illustrative embodiment, the above described infrared detection technique is carried out in a visibly lighted environment. An out-of-phase image (or watermark) is embedded in media. The media is illuminated with an infrared illumination source, and a digital camera captures an image of the media. Preferably, the camera includes an IR-pass filter. The digital camera communicates with a computing device, which detects and decodes an out-of-phase image (or digital watermark) embedded in the media.

Infrared detection is an elegant solution to detect out-of-phase images or digital watermarks, since high transmission colors in the IR spectrum are effectively washed out, allowing detection of a low transmission color channel. Specialized inks are not required to embed the out-of-phase digital watermark. Indeed most multicolor printer ink packs, offset ink, process inks, dye diffusion thermal transfer inks, such as inks conforming to the SWOP standard include black inks that allow infrared detection. Some of these inks include a carbon-based black ink, furthering the absorption of IR. While infrared detection is ideal for out-of-phase images or digital watermarks, this method is also applicable to detection of conventional digital watermarks. For instance, a watermark signal can be embedded only in a black channel of media. Infrared illumination helps to reveal the embedded watermark in this black channel. Alternatively, a digital watermark is embedded across many color planes, while detection is carried out in only those color planes that are perceptible with IR illumination. Additionally, while we have discussed infrared detection techniques, we note that ultraviolet (UV) detection is also possible. In this case, one of the color channels (including the K channel) preferably includes UV pigments or properties. A UV detection process is carried out in a manner analogous to that discussed above. (We also note that a CMY color can include IR/UV pigments or properties to facilitate detection of that color with respective IR or UV detection methods).

Applications

Now consider a few applications of our inventive out-of-phase hiding techniques.

Identification Documents (e.g., Passports, Driver's Licenses, Etc.)

An out-of-phase image is hidden in an identification document to provide enhanced security. For example, a hidden image is a gray-scale version of the identification document's photograph. An airport screener, or law enforcement officer, illuminates the out-of-phase image with infrared (or ultraviolet) light for comparison of the hidden image to the printed photograph. Or, instead of a photograph, the hidden image may include text, which can be compared with the visibly printed text on the identification document.

In assignee's U.S. Published Patent Application No. US 2002-0170966 A1, we disclosed various security and authentication improvements. One disclosed improvement ties machine-readable code such as barcode information to a digital watermark. Our inventive out-of-phase hiding techniques can be used with the techniques disclosed in the above-mentioned application. For example, instead of hiding an out-of-phase image in the identification document, we instead embedded an out-of-phase digital watermark. The digital watermark includes a payload, which has information corresponding to the printed information or to information included in a barcode. In one implementation, the information includes a hash of the barcode information. In another implementation, we hid a barcode in the identification document as discussed below.

Hiding Bar Codes in Out-of-Phase Channels

Over the years, a number of standards organizations and private entities have formed symbology standards for bar codes. Some examples of standards bodies include the Uniform Code Council (UCC), European Article Numbering (EAN, also referred to as International Article Numbering Association), Japanese Article Numbering (JAN), Health Industry Bar Coding Counsel (HIBC), Automotive Industry Action Group (AIAG), Logistics Application of Automated Marking and Reading Symbols (LOGMARS), Automatic Identification Manufacturers (AIM), American National Standards Institute (ANSI), and International Standards Organization (ISO).

The UCC is responsible for the ubiquitous bar code standard called the Universal Product Code (UPC). AIM manages standards for industrial applications and publishes standards called Uniform Symbology Standards (USS). Some well know bar code schemes include UPC and UCC/EAN-128, Codabar developed by Pitney Bowes Corporation, 12 of 5 and Code 128 developed by Computer Identics, Code 39 (or 3 of 9) developed by Intermec Corporation, and code 93.

Some bar codes, such as UPC, are fixed length, while others are variable length. Some support only numbers, while others support alphanumeric strings (e.g., Code 39 supports full ASCII character set). Some incorporate error checking functionality.

While the bar codes listed above are generally one-dimensional in that they consist of a linear string of bars, bar codes may also be two-dimensional. Two dimensional bar codes may be in a stacked form (e.g., a vertical stacking of one-dimensional codes), a matrix form, a circular form, or some other two-dimensional pattern. Some examples of 2D barcodes include code 49, code 16 k, Data Matrix developed by RVSI, QR code, micro PDF-417 and PDF-417.

For more information on bar codes, see D. J. Collins, N. N. Whipple, Using Bar Code-Why It's Taking Over, (2d ed.) Data Capture Institute; R. C. Palmer, The Bar Code Book, ($3^{rd}$ ed.) Helmers Publishing, Inc., and P. L. Grieco, M. W. Gozzo, C. J. Long, Behind Bars, Bar Coding Principles and Applications, PT Publications Inc., which are herein incorporated by reference.

A hidden, out-of-phase image can include a barcode. Consider the vast possibilities. A barcode is often disdained for aesthetic reasons, but a hidden, out-of-phase barcode can carry relatively large amounts of information while remaining virtually imperceptible. In one implementation, a barcode is redundantly hidden or titled throughout media using our out-of-phase embedding techniques. This allows for robust barcode detection even if only a portion of the media is recoverable. In another implementation one or more barcodes are placed in predetermined areas throughout the image. In still another implementation, a barcode reader, such as those provided by Symbol (e.g., the VS4000 and P300IMG models) or Welch Allyn (e.g., the Dolphin model), is augmented with an infrared illumination source and/or IR-filters. Once illuminated, the barcode reader detects and decodes a barcode hidden in a K channel.

Fiducials and Orientation Signal

In some digital watermarking techniques, the components of the digital watermark structure may perform the same or different functions. For example, one component may carry a message, while another component may serve to identify the location or orientation of the watermark in a signal. This orientation component is helpful in resolving signal distortion issues such as rotation, scale and translation. (Further reference to orientation signals can be made, e.g., to previously mentioned application Ser. No. 09/503,881). In some cases, channel capacity is congested by an orientation signal.

One improvement is to embed an orientation signal using our out-of-phase hiding techniques. The message component of a digital watermark can then be embedded using out-of-phase or non-out-of-phase embedding techniques. This improvement will increase message capacity, while improving visibility considerations. Scale, orientation, and image translation can be resolved based on the orientation of the fiducial.

Figure 13:
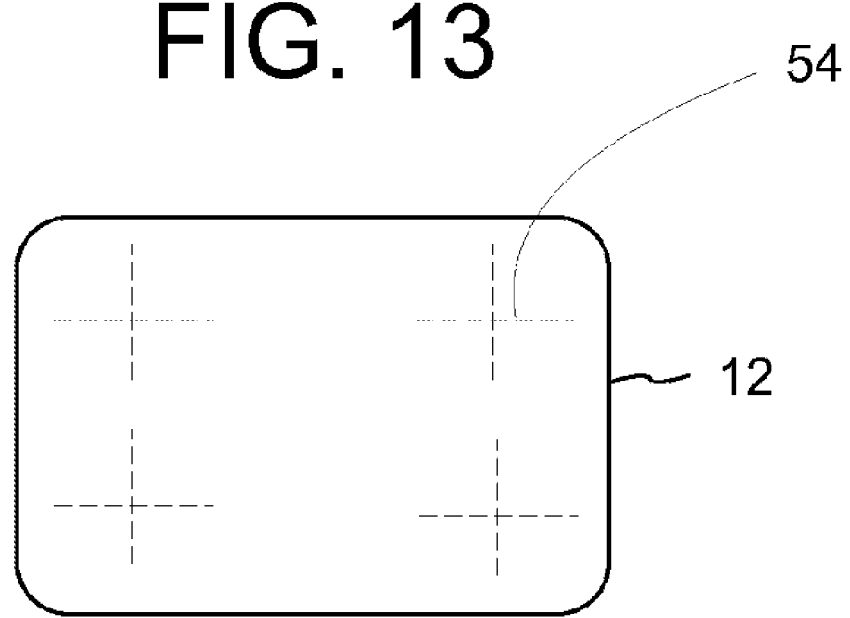
FIG. 13 illustrates orientation fiducials hidden in a media signal with our out-of-phase embedding techniques.

A related improvement embeds a plurality of fiducials or orientation markers 54 in an out-of-phase channel of media 12 (FIG. 13). A watermark detection module detects the fiducials to identify distortion.

Spot Colors

Figure 14:
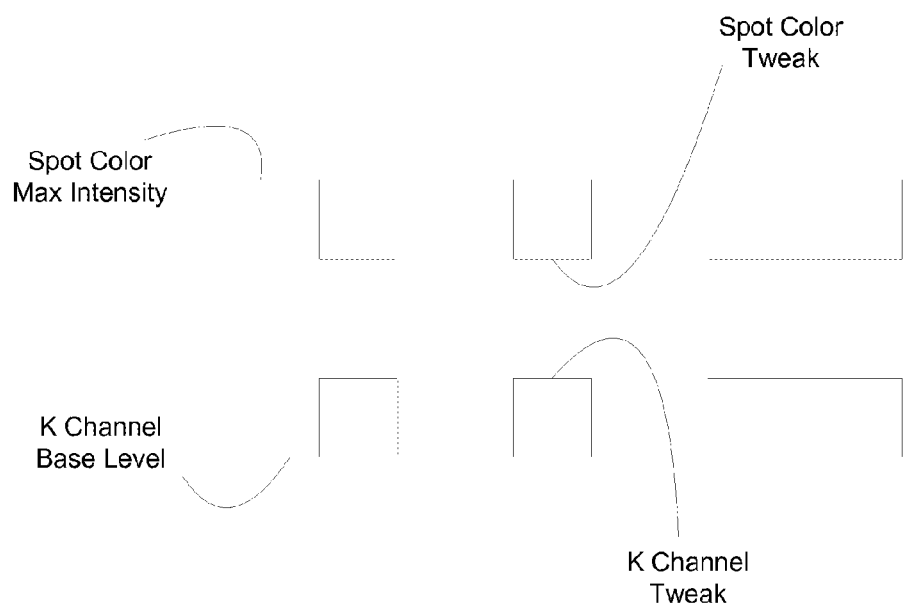
FIG. 14 illustrates out-of-phase embedding of a spot color.

We have found that our inventive techniques are not limited to process colors. Indeed, our out-of-phase techniques can be extended to spot colors. (See Assignee's U.S. patent application Ser. No. 10/074,677, filed Feb. 11, 2002 (now U.S. Pat. No. 6,763,124), for a further discussion of spot colors and digitally watermarking spot colors. The U.S. Pat. No. 6,763,124 patent is hereby incorporated by reference). With reference to FIG. 14, and preferably (but not limited to) relatively darker spot colors, e.g., violets, blues, etc., we counteract a watermark signal (or image) embedded in the spot color channel with an inverted signal in a K channel. Preferably, the K channel base intensity is subtle (e.g., 0% as represented by the K channel base level dashed line in FIG. 14) in comparison to the base level spot color intensity (e.g., 100% intensity as represented by the spot color maximum level dashed line in FIG. 14). The watermark signal (or image) signal is embedded through a combination of negative spot color tweaks and positive, offsetting, K channel tweaks. Infrared illumination facilitates detection of the K-channel watermark tweaks. (Embedding a spot color need not be limited to negative tweaks. Indeed, if the spot color is not at 100% intensity, positive spot color tweaks and corresponding negative K channel tweaks can facilitate embedding).

Paper Information and Printing Processes

Another improvement is to carry printing process information and/or paper characteristics with a digital watermark. For example, a digital watermark may include signal gain or embedding characteristics that are specific to a printing press, printing process, process ink type or paper characteristics. The digital watermark can be embedded in a digital file, which is analyzed prior to a print run. The embedding process is adjusted according to the watermark data. Or the watermark signal can be analyzed after printing one or more test copies. The signal strength or payload metric can be analyzed to determine whether the process should be adjusted.

Figure 15:
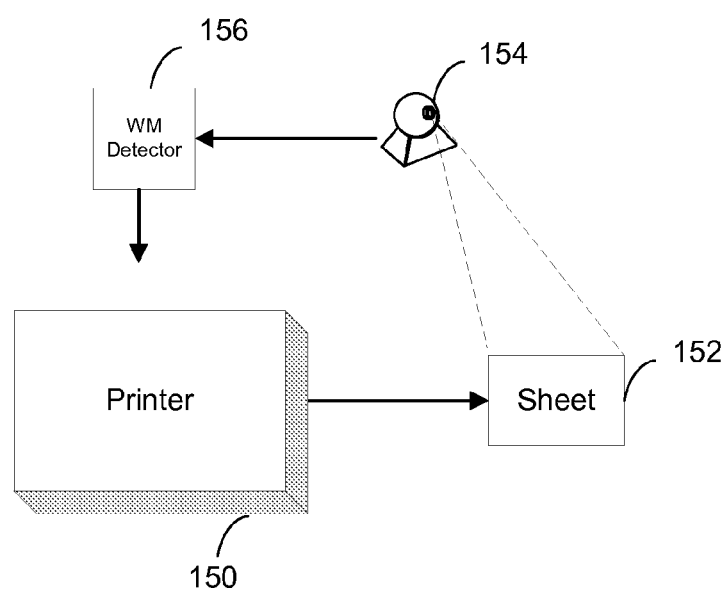
FIG. 15 illustrates a printer calibration process.

Our out-of-phase digital watermark can be used to detect a misalignment in a printing process. With reference to FIG. 15 a printer 150 outputs a CMYK (or spot color, etc.) printed sheet 152. The printed sheet includes an out-of-phase digital watermark or image hidden therein. An input device 154 captures an image of sheet 152. Preferably, input device 154 captures a visible spectrum image of sheet 152. The input device provides the captured image (e.g., digital scan data) to a watermark detector 156. The watermark detector 156 analyzes the captured image in search of the embedded out-of-phase digital watermark. The watermark detector 156 should not be able to detect the embedded watermark if the printing of the CMY and K are aligned, due to the localized cancellation of the signal tweaks (or luminance changes). The term aligned in this context implies that the CMY and K are sufficiently inverted to allow localized cancellation. A misalignment is identified if the watermark detector 156 reads the digital watermark. Such a misalignment is optionally communicated from the watermark detector 156 to the printer 150 or otherwise provided to announce the printing misalignment. Of course other alignment and color balance information can be identified from the detection of the digital watermark.

Color Channel Keys

A related inventive technique embeds a key in one color channel for decoding a watermark in a second color channel. Consider an implementation where a first digital watermark is embedded in a first color channel. The first digital watermark includes a payload including a key. The key is used to decode a digital watermark embedded in a second color plane. The term decode in this context includes providing a reference point to locate the second watermark, providing a key to unlock, decrypt, decode or unscramble the second digital watermark payload, etc. Of course this inventive technique is not limited to our out-of-phase digital watermarks.

Fragile Security

Our out-of-phase hiding techniques are fragile since a signal processing operation that combines the K channel with the CMY channels effectively cancels the hidden signal. A fragile watermark is one that is lost or degrades predictably with signal processing. Conversion to other color spaces similarly degrades the watermark signal. Take a typical scan/print process for example. Digital scanners typically have RGB image sensors to measure the image color. Scanning an out-of-phase embedded CMYK image degrades the embedded watermark due to the combination of K with CMY in a local area, effectively canceling the watermark. When the RGB image representation is converted to CMYK and printed, the watermark signal is effectively lost. Similarly, other conversions, such as to an L*a*b color space, degrade the out-of-phase watermark due to the combination of K with CMY throughout local areas. Nevertheless, the watermark signal is detectable from an original CMYK media, since the K channel can be detected separately by viewing, e.g., in the near infrared.

A fragile watermark has utility in many applications. Take counterfeiting, for example. The inventive fragile watermark is embedded in original CMYK media. If the media is copied, the embedded fragile watermark is either lost or degrades predictably. The copy is recognized as a copy (or counterfeit) by the absence or degradation of the fragile watermark. Fragile watermarks can also be used in conjunction with other watermarks, such as robust watermarks. The fragile watermark announces a copy or counterfeit by its absence or degradation, while the other robust watermark identifies author, source, links and/or conveys metadata or other information, etc. In other embodiments, a fragile watermark is an enabler. For example, some fragile watermarks may include plural-bit data that is used to enable a machine, allow access to a secure computer area, verify authenticity, and/or link to information. This plural-bit data is lost or sufficiently degrades in a copy, preventing the enabling functions.

Another inventive feature is to embed a hash or other representation of a product (e.g., product code or serial number) in a digital watermark payload or message. The digital watermark is then tied or linked directly to the product. If the product includes a barcode having the product code, such can be compared with the digital watermark.

Imperceptible Embedding

Figure 16:
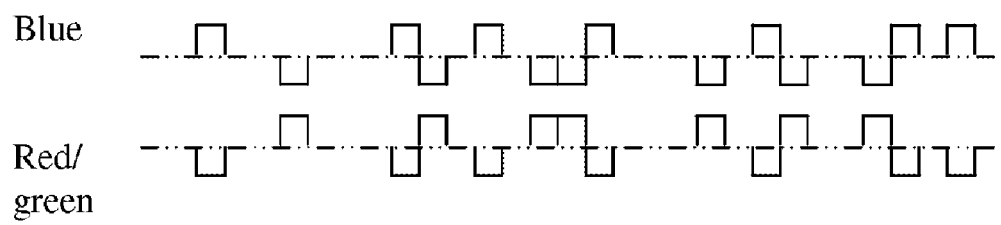
FIG. 16 illustrates embedding in a blue channel with offsetting embedding occurring in red and green channels.

Our inventive techniques provide a very imperceptible digital watermark, particularly for printed images. One advantage of our embedding techniques is that a relatively strong signal can be inserted while still minimizing visibility to the human eye. In one implementation we take advantage of low sensitivity of the human visual system to high frequency blue/yellow (e.g., chrominance). With reference to FIG. 16 a blue signal tweak (e.g., representing a watermark component in terms of pixel color values) is calculated. The signal tweak can be in the form of a spatial image change (e.g., pixel color values) or frequency domain change. (If a frequency change, the change is preferably converted to a spatial domain adjustment so that an offsetting signal change can be determined). In fact a watermarking signal, e.g., as described in assignee's U.S. Pat. Nos. 6,614,914 and 6,122,403, can be provided and such a signal can be used as a blue channel tweak. (In actuality there will by many such tweaks spread over an image in various locations.) An inverted or offsetting signal tweak is then determined for the red and green channels at a corresponding image area (e.g., corresponding spatial or pixel location, but in the different channels). One goal of the inverted signal is to provide a resulting image with constant luminance at the various embedding areas. For each tweak in the blue change, we preferably provide an offsetting tweak in the red and/or green channels. This offsetting tweak cancels or offsets localized luminance changes attributable to the blue channel change. We have found that an inverted or offsetting signal tweak of minus ⅛ of the blue tweak that is applied to each of the red and green color channels helps maintain constant luminance in image or video areas receiving signal tweaks. (For example is a signal tweak of 16 is applied to a blue pixel or group of pixels, a minus 2 signal tweak is applied to a corresponding pixel or group of pixels in the red and green channels.) Thus, the watermark signal is effectively conveyed in chrominance. (While we prefer a ⅛ tweak change in each of the red and blue channels, some luminance cancellation is found as the minus tweak values range from about 1/16 to ¼.) We sometimes—affectionately—refer to this type of digital watermark embedding as "blue phase" embedding.

The "tweaked" or embedded color channels are provided to a printer for printing. We note that most of today's printers and/or printer drivers have sophisticated color converters that convert RGB signals into CMY or CMYK signals for printing. Those of ordinary skill in the art will know of different color converting techniques as well. Our above blue phase watermarking survives this color conversion quite robustly.

Watermark detection of a printed document includes presenting the printed image to an optical scanner. The optical scanner captures scan data corresponding to the printed image, preferably including scan data representing (or converted to) red, green and blue channels. We can combine the color channels to help emphasize the watermark signal and minimize image interference. For example, we preferably scale and process the color channels per pixel color or chrominance values as follows:

Detection Signal (chrominance)=0.5*blue−0.25*(red+green)+128.

The scaling of color channels is chosen to minimize image interference (e.g., color channels are subtracted) and avoid saturation, e.g., if color data is being represented as an 8 bit value. The 128 pixel color or grayscale value helps shift a color value to avoid color saturation. Of course this shifting value can range depending on image characteristics, detector requirements, etc. For example, the shift can be in a color value (e.g., often represented as a grayscale value for a particular color channel) range of about 64-192. Acceptable detection may also occur when the blue channel is scaled in a range of 0.3-0.75 and the red+green are scaled proportionally in a range of 0.15-0.375.

Since the watermark signal is effectively conveyed in the chrominance channel, we have found that this type of watermarking is somewhat susceptible to JPEG compression. Nevertheless, while print applications are one of the main areas of application for these blue phase techniques, there are many other areas that will benefit from these techniques as well, e.g., digital cinema. Our blue phase techniques are used to embed a digital watermark signal in a video signal after it is decompressed, but before (or as) it is being projected on the screen. That is, the uncompressed data stream is feed into a digital watermark embedder. The various color channels are embedded as discussed above. The projected video includes a blue phase watermark. The watermark can include a plural-bit payload that, e.g., identifies the projector, theater, date/time, movie, etc. We can add a buffering system to ensure that the perceived video—from the paying customer's point of view—is uninterrupted.

Another application is a combination of a blue phase watermark with other types of watermarks (e.g., luminance based watermark). Chrominance and luminance are generally orthogonal. This allows for little or no interference between these types of watermarks. Different watermark components can be conveyed with each type of watermark. For example, a chrominance based watermark can include a so-called watermark orientation component while a luminance based watermark includes a message or payload that is synchronized according to the watermark orientation component. The message or payload can vary across an image (e.g., the plural-bits of the message change according to spatial location) while the orientation component remains constant. This is particularly helpful in map or geo-location applications, where different image regions represent different geo-locations. The messages or payloads can represent or link to geo-location information. The curious reader is directed to the following related applications: US 2002-0122564 A1; US 2002-0124171 A1; US 2002-0135600 A1 and US 2004-0008866 A1, which are each hereby incorporated by reference. If using two types of watermarking, a detector can be constructed that analyzes different frames under different detection protocols. For example, a first frame is analyzed according to the blue phase detection mentioned above. A second frame is analyzed to detect a luminance (or other) based watermark. A third frame is again analyzed to detect a blue phase watermark, etc.

We have also found that our blue phase watermarking provides strong detection results in many of today's handheld readers (e.g., cell phones, PDA, etc).

Of course our blue phase embedding techniques can be used with the many other implementations and features discussed in this and the incorporated by reference patent documents. For example, instead of embedding a watermark signal, we can embed an image or 2D barcode with blue phase techniques. For every blue phase change to represent an image or 2D barcode, we can introduce a corresponding and offsetting change in red and green—in hopes of maintain constant luminance in embedding areas.

Conclusion

Preferably, an out-of phase watermark signal is embedded 180 degrees out-of-phase with corresponding channels. However, some cancellation will still be achieved if the signal is approximately 180 degrees, for example, in a range of .+−0.0-50% from the 180-degree mark. The term "inverted" includes values within this range. We note that while the present disclosure has been described with respect to CMYK process inks, the present invention is not so limited. Indeed, our inventive techniques can be applied to printing processes using more than four inks with the K channel canceling the three or more color channels. Similarly, as shown above under the spot color discussion, our inventive techniques are also applicable to printing processes using less than four inks. Of course our techniques can be used with a variety of printing techniques, including offset printing, dye diffusion thermal transfer (D2T2), other thermal transfers, process ink printing, etc., etc., etc.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, the above-mentioned patents and patent applications are hereby incorporated by reference, along with U.S. Pat. No. 6,763,122. The particular combinations of elements and features in the above-detailed embodiments are exemplary only; the interchanging and substitution of these teachings with other teachings in this application and the incorporated-by-reference patents/applications are also contemplated.

The above-described methods and functionality can be facilitated with computer executable software stored on computer readable media, such as electronic memory circuits, RAM, ROM, magnetic media, optical media, memory sticks, hard disks, removable media, etc., etc. Such software may be stored and executed on a general purpose computer, or on a server for distributed use. Data structures representing the various luminance values, out-of-phase embedded signals, embedded color planes, color signals, data signals, luminance signals, etc., may also be stored on such computer readable media. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

What is claimed is:

1. A method comprising:
   receiving image data comprising a plurality of pixels, wherein the image data represents a blue channel, a green channel and a red channel for each of the plurality of pixels, wherein the blue channel of a subset of pixels has been adjusted by a first factor to embed steganographic indicia, wherein the green channel and red channel of the subset of pixels have been adjusted by a second factor offsetting a luminance change resulting from adjusting the blue channel by the first factor, and wherein the blue channel, the green channel, and the red channel each comprise distinct pixel components;
   minimizing image interference by combining data representing the blue channel in each pixel, data representing the green channel in each pixel and data representing the red channel in each pixel to yield combined red, green, and blue channel data for each pixel;
   reducing image saturation by shifting the combined and minimized channel data; and searching, using a programmed electronic processor or electronic hardware, for the steganographic indicia in the shifted, combined, and reduced channel data.

2. The method of claim 1, wherein the shifted, combined, and reduced channel data represents chrominance characteristics.

3. The method of claim 1, wherein the steganographic indicia comprises a machine-readable code.

4. The method of claim 3, wherein the machine-readable code comprises digital watermarking 5. The method of claim 1, wherein the steganographic indicia comprises an image or graphic.

6. The method of claim 1, wherein reducing image saturation by shifting the combined channel data comprises adding a shift factor.

7. The method of claim 6, wherein the shift factor is in a color value range of 64-192.

8. The method of claim 1, further comprising:
scaling data representing the blue channel using a third factor;
scaling data representing the red channel using a fourth factor, wherein the third factor is different from the fourth factor; and
scaling data representing the green channel using the second factor, wherein minimizing image interference by combining channel data comprises combining the scaled data representing the blue channel, the scaled data representing the red channel, and the scaled data representing the green channel to yield the combined channel data.

9. The method of claim 1, wherein the steganographic indicia comprises an orientation component, and wherein the method further comprises:
detecting a second steganographic indicia in the captured data, wherein the second steganographic indicia is synchronized according to the orientation component.

10. The method of claim 1, wherein minimizing image interference by combining data representing the blue channel, data representing the green channel and data representing the red channel comprises:
shifting the data representing the blue channel by a third factor;
shifting a sum of the data representing the red channel and the data representing the green channel; and
subtracting the shifted sum of the data representing the red channel and the data representing the green channel from the data representing the blue channel to yield combined channel data.

11. The method of claim 1, wherein the first factor is different than the second factor, wherein the second factor is calculated based on the first factor.

12. An apparatus comprising:
a processor configured to:
receive image data comprising a plurality of pixels, wherein the image data represents a blue channel, a green channel and a red channel for each of the plurality of pixels, wherein the blue channel of a subset of pixels has been adjusted by a first factor to embed steganographic indicia, wherein the green channel and red channel of the subset of pixels have been adjusted by a second factor offsetting a luminance change resulting from adjusting the blue channel by the first factor, and wherein the blue channel, the green channel, and the red channel each comprise distinct pixel components;
minimize image interference by combining data representing the blue channel in each pixel, data representing the green channel in each pixel and data representing the red channel in each pixel, to yield combined red, green, and blue channel data for each pixel;
reduce image saturation by shifting the combined channel data; and
search for the steganographic indicia in the shifted, combined, and reduced channel data.

13. The apparatus of claim 12, wherein the shifted, combined, and reduced channel data represents chrominance characteristics.

14. The apparatus of claim 12, wherein the steganographic indicia comprises a machine-readable code.

15. The apparatus of claim 14, wherein the machine-readable code comprises digital watermarking.

16. The apparatus of claim 12, wherein the steganographic indicia comprises an image or graphic.

17. The apparatus of claim 12, wherein to reduce image saturation by shifting the combined channel data the processor is configured to add a shift factor.

18. A non-transitory computer-readable medium having instructions stored thereon, the instructions comprising:
instructions to receive image data comprising a plurality of pixels, wherein the image data represents a blue channel, a green channel and a red channel for each of the plurality of pixels, wherein the blue channel of a subset of pixels has been adjusted by a first factor to embed steganographic indicia, wherein the green channel and red channel of the subset of pixels have been adjusted by a second factor offsetting a luminance change resulting from adjusting the blue channel by the first factor, and wherein the blue channel, the green channel, and the red channel each comprise distinct pixel components;
instructions to minimize image interference by combining data representing the blue channel in each pixel, data representing the green channel in each pixel and data representing the red channel in each pixel, to yield combined red, green, and blue channel data for each pixel;
instructions to reduce image saturation by shifting the combined channel data; and
instructions to search for the steganographic indicia in the shifted, combined, and reduced channel data.

19. The non-transitory computer-readable medium of claim 18, wherein the shifted, combined, and reduced channel data represents chrominance characteristics.

20. The non-transitory computer-readable medium of claim 18, wherein the steganographic indicia comprises a machine-readable code, and wherein the machine-readable code comprises digital watermarking 21. The non-transitory computer-readable medium of claim 18, wherein the instructions to reduce image saturation by shifting the combined channel data comprises instructions to add a shift factor.

* * * * *